Oct. 5, 1954  J. O. CREEK  2,690,703
MILLING CUTTER TOOLHEAD

Filed Jan. 15, 1952  2 Sheets-Sheet 1

INVENTOR
J. O. CREEK
PER
ATTORNEY

Oct. 5, 1954
J. O. CREEK
2,690,703
MILLING CUTTER TOOLHEAD
Filed Jan. 15, 1952
2 Sheets-Sheet 2
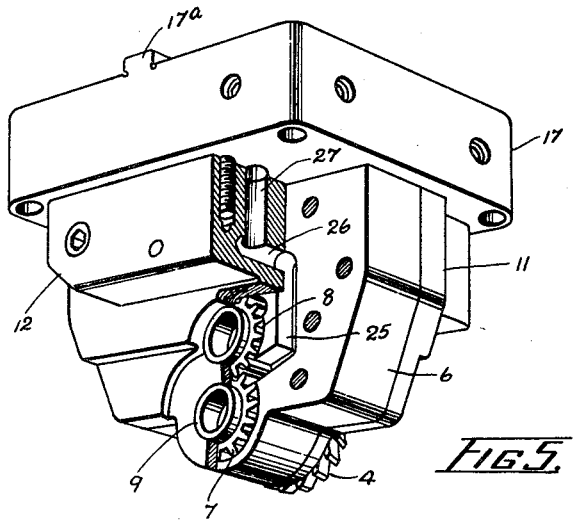
FIG.5.
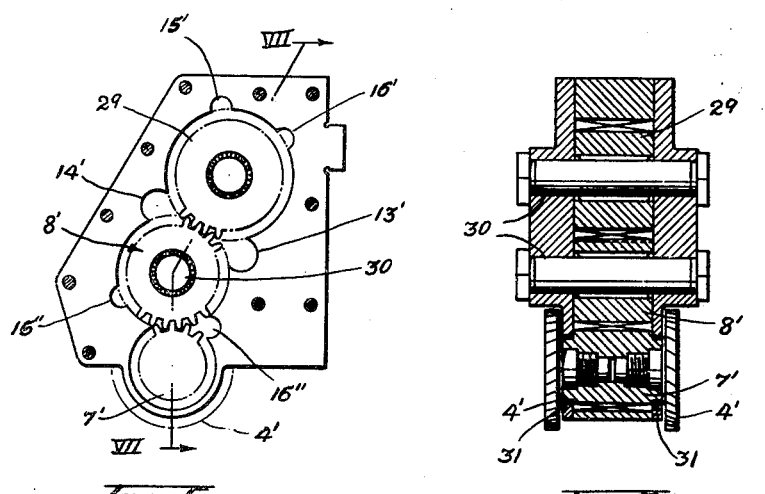
FIG.6.
FIG.7.
INVENTOR
J. O. CREEK
PER
ATTORNEY Patented Oct. 5, 1954

2,690,703

UNITED STATES PATENT OFFICE 2,690,703

MILLING CUTTER TOOLHEAD

John Oliver Creek, Brampton, Ontario, Canada, assignor to A. V. Roe Canada Limited, Malton, Ontario, Canada, a corporation Application January 15, 1952, Serial No. 266,457

6 Claims. (Cl. 90—11)

The invention relates to milling cutter tool heads, and more particularly to a milling cutter tool head which is especially adapted for use in machining trough-shaped recesses.

In the production of experimental test blades for use in connection with the design and development of the blades of the turbines and compressors of gas turbine engines, it is desired to make each blade from a block of appropriate length, cut off from bar stock, by milling a trough-shaped recess in the block corresponding to the concave face of the blade. To suit the design of such test blades, the ends of the trough-shaped recess must be solid or closed; and in the case of a blade of highly cambered aerofoil section, the recess must be substantially semi-circular in cross section.

A shallow trough-shaped recess having closed ends can be cut by reciprocating a standard milling cutter relatively to a workpiece. However, the driving arbor of the cutter would foul the surface of the workpiece at the closed or uncut ends of the trough-shaped recess, if an attempt were made to cut a trough-shaped recess of substantially semi-circular cross section, and it is consequently impractical to use a standard milling cutter tool head for this purpose.

The main object of the present invention is, therefore, the provision of an improved construction of milling cutter tool head in which a pair of coaxial cutters is adapted to be driven in such a manner that a trough-shaped recess as deep as the cutter radius can be milled without fouling the surface of the workpiece at the closed ends of the trough.

To achieve this object a pair of coaxial cutters is driven by means of a drive disposed between the cutters. For the purpose described, the outer faces of the cutters must not be spaced apart a distance exceeding half the length of the recesses to be cut. In practice, for machining some test blades, the distance between the faces of the cutters is only 1¼ inches. This close spacing of the milling cutters creates a difficult problem in devising a suitable driving means, particularly since it is necessary to employ a relatively powerful motor when driving milling cutters and there is no room for a large diameter output gear to obtain a favourable gear ratio.

Obviously the use of a drive arbor such as used in a standard milling machine is not practical. Yet it is essential that the power transmission mechanism be strong and steady. The use of a train of gears would result in chatter due to the slight play which is inevitable at each point of meshing of the gears. A similar problem is involved in chain or other ordinary types of drive.

According to this invention, the milling cutter tool head comprises an output gear having a mounting at each end for a milling cutter, a pair of milling cutters mounted coaxially of the said output gear, a prime mover gear meshing with the said output gear, and a casing which constitutes a hydraulic motor casing and having a portion of which encloses and supports the said output gear for rotary movement, the said casing below, or on the side remote from the prime mover gear of, a plane in which lies the axis of rotation of the cutters lying entirely within a hypothetical cylinder the ends of which are formed by the cutters.

Preferred embodiments of the invention will now be more particularly described with reference to the accompanying drawings, in which like reference characters designate corresponding parts throughout the several views, and in which:

Fig. 5 is a broken away perspective view of the head;

Fig. 6 is a side elevation of a milling cutter tool head constructed in accordance with a further embodiment of the invention, one side cover plate being omitted; and Fig. 7 is a section taken on the line VII—VII of Fig. 6.

Figure 1:
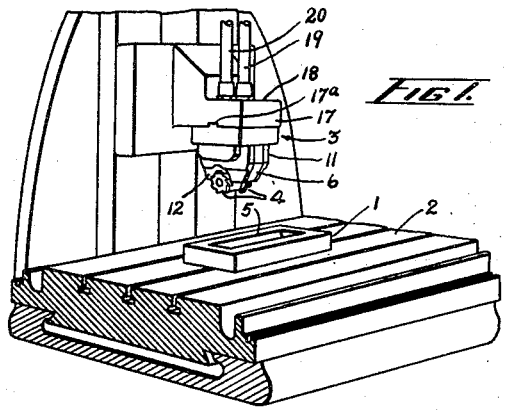
Fig. 1 is a perspective view of a milling machine on which is mounted a tool head in accordance with the invention.

Referring to Fig. 1, a workpiece 1 is mounted on a table 2 of a milling machine, and a tool head 3 constructed in accordance with the present invention and incorporating its own hydraulic driving motor for a pair of rotary side and face milling cutters 4, 4, is mounted on a vertically movable slide of the milling machine. By moving the table 2 to reciprocate the workpiece 1 in a horizontal plane whilst feeding the tool head 3 downwardly, it is possible to mill a trough-shaped recess 5 with closed ends in the workpiece 1, the depth of which recess is as great as the radius of the milling cutters 4.

Figures 2, 3:
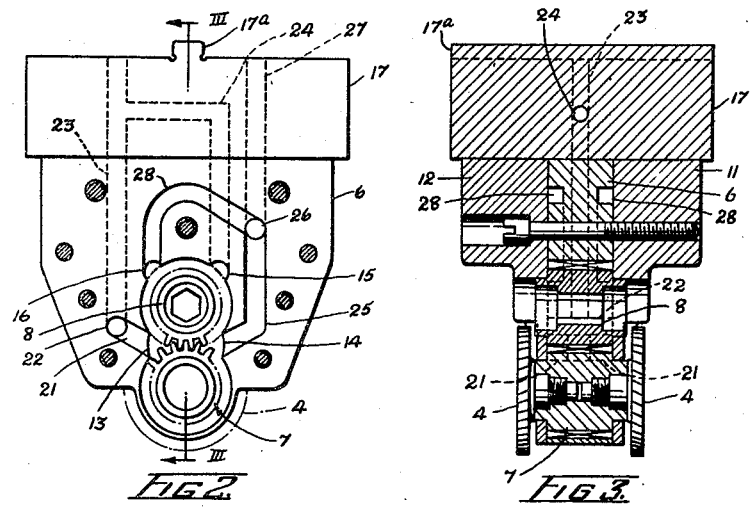
Fig. 2 is a side elevation of a milling cutter tool head constructed in accordance with the invention, one side cover plate being omitted.
Fig. 3 is a section taken on the line III—III of Fig. 2 with both side plates shown.
Figure 4:
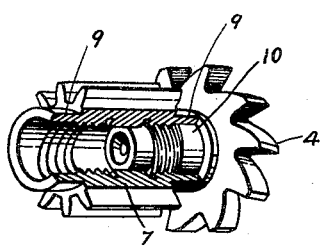
Fig. 4 is a broken away perspective view on an enlarged scale of the output gear showing one cutter mounted thereon.

By reference to Figs. 2 and 3, which illustrate the detailed construction of the milling cutter tool head 3 used in the machine shown in Fig. 1, it will be seen that the said tool head includes a casing composed of a horizontal plate and three vertical plates held together by bolts extending through suitable holes drilled in the plates. The centre plate 6 has two parallel over-lapping bores in which are mounted an output gear 7 and a meshing prime mover gear 8. At each end of the output gear 7 is a concentric spigot 9 (see Fig. 4). A concentric bore extends through the gear and is tapped at each end to receive a correspondingly screw-thread shank 10 of a side and face milling cutter 4, one screw being right hand and the other being left hand according to the direction of rotation of the cutters 4. The outer cover plates 11 and 12 of the casing are bored to receive the spigots 9, the parts being suitably ground and hardened to form a bearing for rotation of the output gear 7. The construction and rotary mounting of the prime mover gear 8 is similar to that of the output gear 7, except that the bore of the prime mover gear 8 is not tapped but is provided with a portion of hexagonal section which is adapted to receive a correspondingly shaped tool which can be used to prevent rotation of the gears 7 and 8 when changing the milling cutters 4.

The gears 7 and 8 are adapted to be driven around by oil under a pressure, for example, of 700 lbs. per square inch, introduced through an inlet port 13 provided at one side of the point of meshing of the gears and discharging through a main exhaust port 14 disposed adjacent the other side of the said meshing point. To balance the radial pressure on the prime mover gear 8 imposed by the oil in the inlet and exhaust ports, a balance port 15 connected to the inlet port 13 is provided diametrically opposite to the said inlet port 13, and a balance port 16 connected to the exhaust port 14 is provided diametrically opposite the said exhaust port 14. Balance ports are not provided for the output gear 7 because of the thinness of the section of the casing surrounding this gear. However, the radial oil pressure on the output gear 7 is balanced to some extent by the reation of the pressure of the milling cutters 4 on the workpiece.

Passageways for fluid are provided in the casing by means of grooves formed in the faces of the central plate 6 and bores extending through the plates 6, 11 and 12 and the horizontal plate 17 to which the vertical plates are secured. The plate 17 is connected by means of bolts (not shown) to bracket 18 on the slide of the milling machine (see Fig. 1) the said plate 17 being located by means of a spline 17a. An inlet pipe or tube 19 for fluid under pressure and an exhaust pipe 20 connect to the bracket 18 and communicate with passageways therein to the passageways in the head hereafter described.

The fluid inlet port 13 is supplied by a passageway formed by two grooves 21, 21 formed in the central plate 6 and enclosed by the plates 11 and 12 respectively. A transverse bore 22 connects the passageways formed by the grooves 21, 21 to a vertical bore 23 which connects through bracket 18 to the fluid inlet pipe 19 by a suitable passageway not shown. Balance inlet port 15 is connected by a bore 24 to the bore 23.

Exhaust port 14 is connected to a passageway provided by a groove 25 in one face of the plate 6. A similar groove (not shown) is formed in the other face, and the grooves are connected by transverse bores 26 in plates 11 and 12 to vertical bores 27 (see Fig. 5), which connects to exhaust line 20. Balance exhaust port 16 opens into grooves 28, 28 in the opposite faces of the plate 6, these grooves being connected to the transverse exhaust bores, 26, 26 respectively.

In the embodiment of the invention illustrated in Figs. 6 and 7, a further prime mover gear 29 is used which coacts with the prime mover gear 8' to constitute the hydraulic motor which drives output gear 7' and milling cutters 4'. With this arrangement balance ports are provided for both of the prime mover gears 8' and 29 subjected to the pressure of the oil in the inlet port 13' and the exhaust port 14', as is clearly shown in Fig. 6, in which balance ports 15' and 15'' are connected with inlet port 13' in the fluid pressure system, and valance ports 16' and 16'' are connected with exhaust port 14' in the exhaust system.

The balance ports are connected to suitable passageways which, for the sake of clarity have not been shown in Figs. 6 and 7, since with necessary modifications they are similar to those shown in Figs. 1 to 5. The construction illustrated in Figs. 6 and 7 is otherwise similar to that previously described with reference to Figs. 2 and 3, except, as shown, the gears 8' and 29 are mounted for rotation on the pins 30, 30, by means, for example, of needle-roller bearings, and the bearings of the output gear are provided with suitable bushings 31. With a construction in accordance with Figs. 6 and 7 designed for a distance between the outer faces of the cutters 4' of only 1¼ inches, oil under a pressure of 1000 lbs. per square inch may be used to produce an output of approximately one horsepower. Since all the gears are operating in oil under high pressure, backlash is virtually eliminated and the milling operation is, consequently performed without chatter of the cutters.

It will be observed that in both embodiments described the lower portion of the casing enclosing the output gear is of thin cross section and substantially semi-cylindrical shape, and in accordance with the invention, the portion of the casing which encloses and supports the output gear lies, at least on one side of a plane in which lies the axis of rotation of the cutters, within a hypothetical cylinder the ends of which are formed by the cutters. To provide the necessary strength and to accommodate the fluid passages and main inlet and exhaust ports, the casing widens on the other side of the said plane passing through the axis of rotation of the cutters, but since this wider portion does not extend beyond said plane it therefore will not foul the surface of the workpiece.

It is to be understood that the details of construction of the above described embodiments of the invention may be modified without exceeding the scope of the invention as defined in the appended claims. For example, instead of making the casing from three layers of appropriately shaped plate, a casing cast from a suitable non-porous metal could be employed. Moreover in the construction illustrated in Figures 2 and 3 the prime mover gear 8 could, if desired, be mounted in the same manner as the prime mover gears shown in Figures 6 and 7. Similarly in the construction illustrated in Figures 6 and 7 the prime mover gears could be rotatably mounted in the same manner as the prime mover gear shown in Figures 2 and 3.

What I claim as my invention is:

1. A milling cutter tool head comprising an output gear having a mounting at each end for a milling cutter, a pair of milling cutters mounted coaxially of said output gear, a prime mover gear meshing with the said output gear, a hydraulic motor casing enclosing and supporting the said gears for rotary movement, inlet and exhaust ports in the casing for introducing fluid under pressure to one side of the point of meshing of the gears and exhausting it on the other side, and passageways in the casing for conveying fluid under pressure to and from the inlet and exhaust ports respectively, the portion of said casing which encloses and supports the said output gear lying, on the side remote from the prime mover gear of a plane in which lies the axis of rotation of the cutters and which is extraneous to the periphery of the prime mover gear, entirely within a hypothetical cylinder the ends of which are formed by the cutters.

2. A milling cutter tool head as claimed in claim 1 in which the casing is formed of three plates secured together, the central plate being provided with bores to receive the gears, and the other plates enclosing said bores and providing bearings for the gears.

3. A milling cutter tool head as claimed in claim 1 in which the casing is formed of three plates secured together, the central plate being provided with grooves in its faces, and the other plates enclosing the grooves to form the passageways for transmission of fluid to the gears.

4. A milling cutter tool head as claimed in claim 1, in which the portion of the casing which lies within the said hypothetical cylinder is semi-cylindrical, and the casing contiguous to said semi-cylindrical portion extends outwardly beyond the periphery of the hypothetical cylinder.

5. A milling cutter tool head as claimed in claim 1, in which the output gear is provided with a concentric spigot at each end thereof adapted to form a bearing for the rotary mounting of the said output gear.

6. A milling cutter tool head as claimed in claim 1, in which the prime mover gear meshes with a further prime mover gear.

References Cited in the file of this patent

UNITED STATES PATENTS

| Number | Name | Date |
|---|---|---|
| 1,029,208 | Melling | June 11, 1912 |
| 1,321,881 | Birchland et al. | Nov. 18, 1919 |
| 1,438,159 | Harsel | Dec. 5, 1922 |
| 1,516,543 | Meier | Nov. 25, 1924 |
| 2,332,609 | Simons | Oct. 26, 1943 |

FOREIGN PATENTS

| Number | Country | Date |
|---|---|---|
| 19,717 | Great Britain | 1913 |
| 458,112 | Great Britain | Dec. 14, 1936 |
| 551,065 | Great Britain | Feb. 5, 1943 |